United States Patent [19]

Byrne

[11] Patent Number: 6,122,128
[45] Date of Patent: Sep. 19, 2000

[54] USING ROTATIONAL VELOCITY TO DETECT SCANNER CLEANING IN MAGNETIC TAPE DRIVE

[75] Inventor: Edward V. Byrne, Boulder, Colo.

[73] Assignee: Exabyte Coroproation, Boulder, Colo.

[21] Appl. No.: 09/045,702

[22] Filed: Mar. 23, 1998

[51] Int. Cl.$^7$ .................................................. G11B 15/18
[52] U.S. Cl. ........................................... 360/69; 360/128
[58] Field of Search .............................. 360/128, 69, 137, 360/75, 84

[56] References Cited

U.S. PATENT DOCUMENTS

| | | | |
|---|---|---|---|
| 3,731,289 | 5/1973 | Bajgert et al. | 360/128 |
| 3,964,104 | 6/1976 | Herron et al. | 360/128 |
| 5,170,304 | 12/1992 | Katohno et al. | 360/128 |
| 5,182,691 | 1/1993 | Mimasu et al. | 360/128 |
| 5,335,128 | 8/1994 | Morinaka | 360/128 |
| 5,341,257 | 8/1994 | Dienbauer | 360/85 |
| 5,386,333 | 1/1995 | Kang et al. | 360/128 |
| 5,473,493 | 12/1995 | Kusui | 360/128 |
| 5,523,913 | 6/1996 | Kim | 360/128 |
| 5,602,694 | 2/1997 | Miles et al. | 360/84 |
| 5,701,224 | 12/1997 | Sakui | 360/128 |
| 5,949,629 | 9/1999 | Suzuki et al. | 360/128 |

*Primary Examiner*—Andrew L. Sniezek
*Attorney, Agent, or Firm*—Nixon & Vanderhye, P.C.

[57] ABSTRACT

A tape drive (20) detects engagement of scanner cleaning assembly (200) with a scanner (90). A cleaning engagement detector (111) uses rotational velocity of the scanner (90) in order to detect engagement of a cleaning wheel (204) with the scanner (90). In particular, cleaning engagement detector (111) detects engagement when a rotational period of the scanner (90) increases by a predetermined amount. When the cleaning engagement detector (111) detects engagement of the cleaning wheel (204) with the scanner (90), a microprocessor (100) controls a duration of the engagement, thereby avoiding wear both of the cleaning wheel (204) and of the heads on the scanner (90).

33 Claims, 9 Drawing Sheets

USING ROTATIONAL VELOCITY TO DETECT SCANNER CLEANING IN MAGNETIC TAPE DRIVE

This is invention is related to that disclosed in U.S. patent application Ser. No. 08/824,118 filed Mar. 26, 1997, now abandoned and entitled "PREVENTING TAPE SLACK IN MAGNETIC TAPE DRIVE", which is incorporated herein by reference.

BACKGROUND

1. Field of the Invention

This invention pertains to the storage or backup of data using magnetic tape drives, and particularly to the cleaning of transducing elements utilized in magnetic tape drives.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted or loaded by mechanisms in the drive so that a segment of the tape is pulled from the cartridge and into a tape path that travels proximate the head unit. In some tape drives the extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed. A capstanless tape drive, particularly a tape drive which utilizes helical scan recording, is shown in U.S. Pat. No. 5,602,694 for CAPSTANLESS HELICAL DRIVE SYSTEM, which is incorporated herein by reference.

As the tape is transported past the head unit, information can be transduced to or from the tape by the tape drive in recording and reading operations, respectively. When the recording and/or reading operations are concluded, and before the cartridge can be unloaded from the drive, the tape must be retracted for return to the interior of the cartridge. Tape retraction is essentially the reverse of the tape extraction procedure described above.

The head unit head unit which includes both one or more write elements and one or more read elements can take the form of a drum around which the tape is partially wrapped. The read and write elements are positioned proximate or on a circumferential surface of the drum. Such a drum with read and write elements is also called a "scanner."

Over time the scanner with its write and read elements can acquire dust or other contaminants. For example, the tape media can introduce the contaminants into the drive or contribute to the collection of debris on the read and write elements as the tape media deteriorates. The presence of such contaminants proximate the write and read elements can degrade the signal recorded on or read from tape media, thereby spawning errors.

Some magnetic tape drives incorporate cleaning mechanisms which endeavor to clean the scanner by removal of contaminants. One type of cleaning mechanism is a roller or wheel which is moved into contact with the periphery of the scanner in order to wipe the write and read elements on the scanner. Examples of cleaning mechanisms are illustrated in the following United States Patents: U.S. Pat. No. 5,473,493 to Kusui; U.S. Pat. No. 5,182,691 to Mimasu et al.; U.S. Pat. No. 5,170,304 to Katohno et al.; U.S. Pat. No. 5,523,913 to Kim; U.S. Pat. No. 3,964,104 to Herron et al.; U.S. Pat. 5,386,333 to Kang et al.; U.S. Pat. No. 5,341,257 to Dienbauer; U.S. Pat. 5,335,128 to Morinaka; and U.S. Pat. No. 3,731,289 to Bajgert et al.

In some instances the cleaning roller or wheel is fabricated from a foam or other material which is sufficiently pliant enough so as to not cause concern about the duration of contact of the cleaning wheel with the scanner. Cleaning wheels generally have superior durability, however, when formed from a less pliant material. Yet usage of less plaint materials for cleaning wheels have introduced complications as explained below.

In a prior art tape drive such as that shown in U.S. Pat. No. 5,602,694, contact of the cleaning wheel with the scanner is coordinated with movement of the tape extraction trolleys. In particular, a cam is attached to geared output of a motor for a trolley drive system, and in response to the cam the cleaning wheel moves into or out of contact with the scanner. To engage the cleaning wheel with the scanner, the trolleys were moved a fixed distance away from a trolley docked position. This fixed distance was calculated to guarantee, given the material and process variations between drives, that the cleaning wheel would engage the scanner in all drives. Because the cleaning wheels were made of a soft material, it did not matter that the cleaning wheels on some drives would touch the scanner for longer periods of time than cleaning wheels on other drives.

The advent of firmer cleaning wheel materials such as cloth or Vilene afforded greater durability. However, these firmer materials do not compress significantly when pressed against the scanner. Given the variation from drive to drive regarding time of contact of the cleaning wheel with the scanner, excessive contact of a firm cleaning wheel with a scanner causes greater wear to both the cleaning wheel and the write and read elements (e.g., the write and read heads).

What is needed, therefore, and an object of the present invention, is a technique for precisely controlling the contact time of a cleaning wheel with a scanner in a magnetic tape drive.

SUMMARY

A tape drive detects engagement of a scanner cleaning assembly with a scanner. A cleaning engagement detector uses rotational velocity of the scanner in order to detect engagement of a cleaning wheel with the scanner. In particular, cleaning engagement detector detects engagement when a rotational period of the scanner increases by a predetermined amount. When the cleaning engagement detector detects engagement of the cleaning wheel with the scanner, a microprocessor controls a duration of the engagement, thereby avoiding wear both of the cleaning wheel and of the heads on the scanner.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
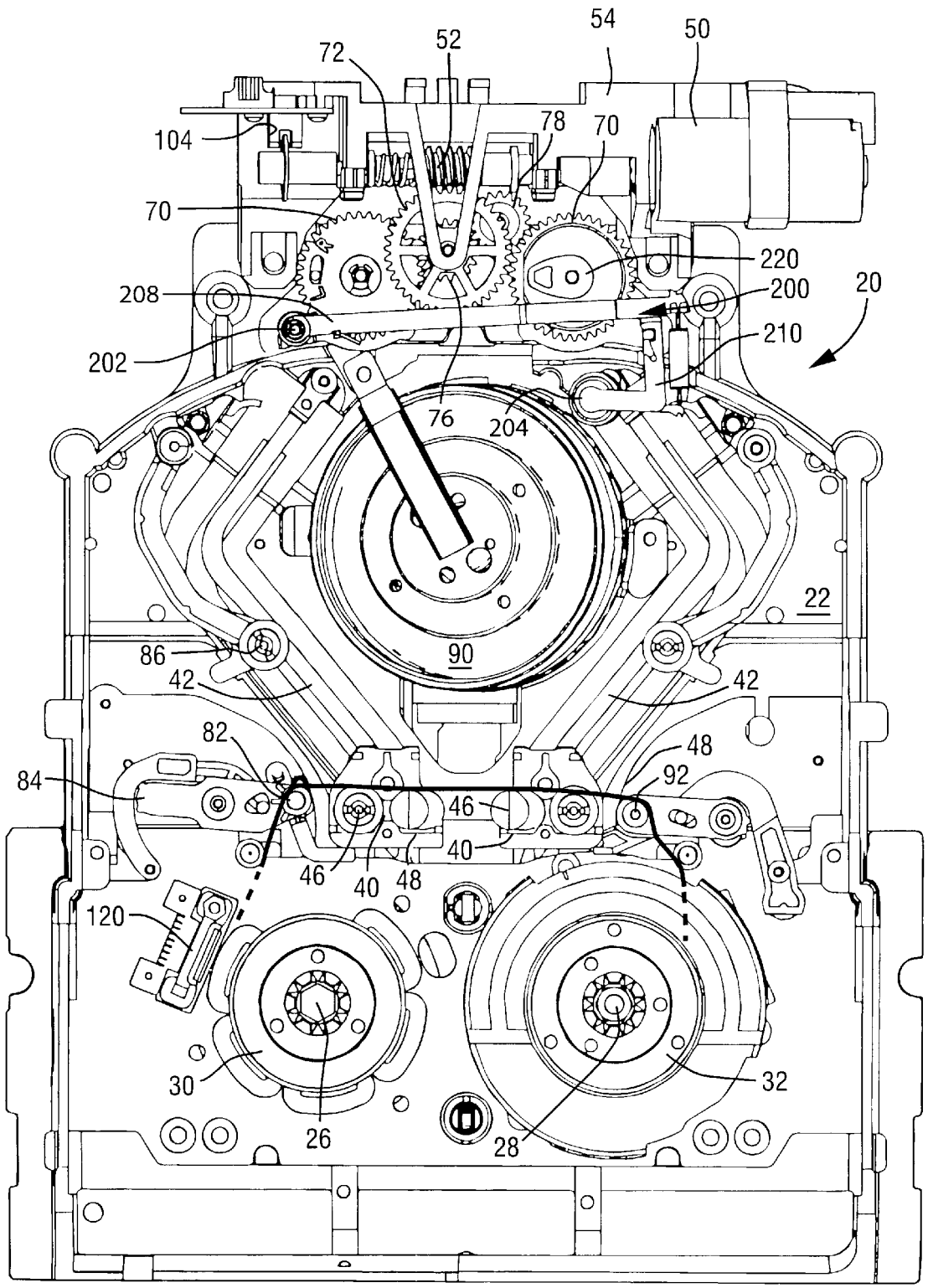
FIG. 1A is a top view of a tape drive of an embodiment of the present invention, with a tape drive housing cover removed, and a scanner cleaning assembly and tape in a tape retracted position.

FIG. 1A shows a tape drive 20 having a chassis 22 which is visible by virtue of removal of an unillustrated drive housing cover. Tape drive 20 includes a supply reel spindle 26 and a take-up reel spindle 28, which are respectively rotatably driven by supply reel motor 30 and take-up reel motor 32. When, for example, a magnetic tape cartridge is inserted into a cartridge slot in a front face of the unillustrated housing of drive 20, a supply reel of the cartridge and a take-up reel of the cartridge ultimately extend over spindles of respective supply reel spindle 26 and take-up reel spindle 28.

Details of supply reel hub 26 and a take-up reel hub 28 are shown in U.S. Pat. 5,602,694 for CAPSTANLESS HELICAL DRIVE SYSTEM, which is incorporated herein by reference. Details of the supply reel motor 30 and the take-up reel motor 32 are understood with reference to one or more of the following (all of which are incorporated herein by reference): U.S. Pat. No. 5,712,539 entitled DIGITAL ACOUSTIC NOISE REDUCTION IN ELECTRIC MOTORS DRIVEN BY SWITCHING POWER AMPLIFIERS; and U.S. Pat. No. 5,426,355 entitled POWER-OFF MOTOR DECELERATION CONTROL SYSTEM.

Figure 2C:
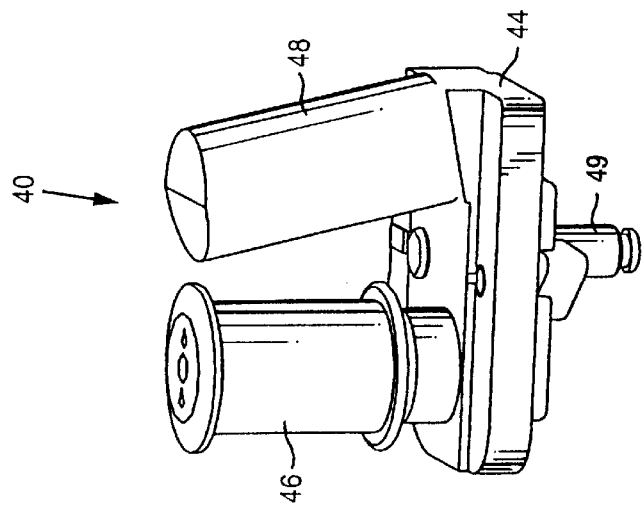
FIG. 2C is a perspective view of the trolley of FIG. 2A.
Figure 2A:
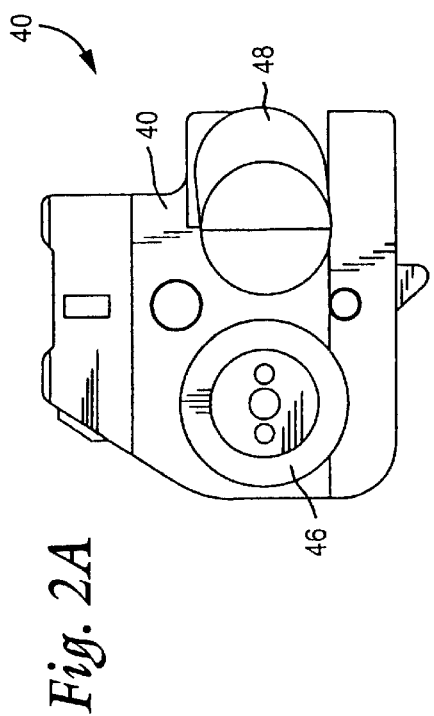
FIG. 2A is a top view of a trolley of the tape drive of FIG. 1A.
Figure 2B:
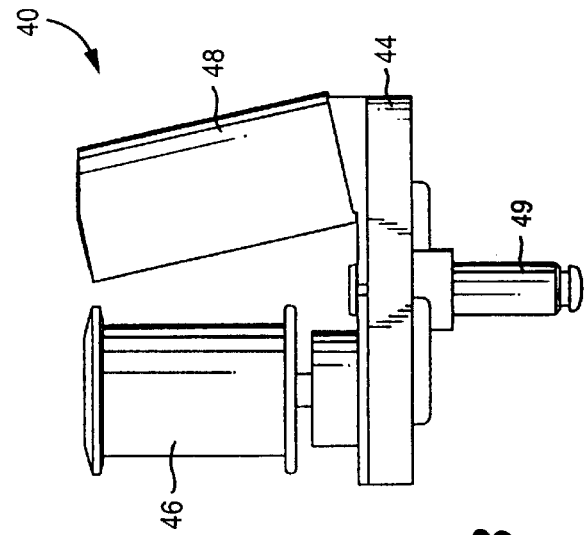
FIG. 2B is a side view of the trolley of FIG. 2A.

Tape drive 20 also includes two trolleys 40 which are utilized to move tape between a tape retracted position and a tape extracted position. The two trolleys 40 travel along respective trolley paths 42. Trolley paths 42 are grooves formed in chassis 22. Trolleys 40, shown in more detail in FIG. 2A, FIG. 2B, and FIG. 2C, each comprise a trolley carriage 44 upon which tape guides 46 and 48 are mounted. Carriage 44 of each trolley 40 has a trolley pin 49 underneath. Trolley pin 49 extends vertically into the groove which forms trolley path 42.

When trolleys 40 are at an extreme front extent of trolley paths 42 as shown in FIG. 1A, any tape extending between the supply reel and the take-up reel is said to be in a tape fully retracted position. In the tape fully retracted position, the tape remains in the cartridge and extends between the tape supply reel and the take-up reel in essentially the same manner as if the cartridge were not inserted into the drive. While in the tape fully retracted position, tape guides 46 and 48 do not displace the tape from the nominal tape position of the cartridge.

Figure 3:
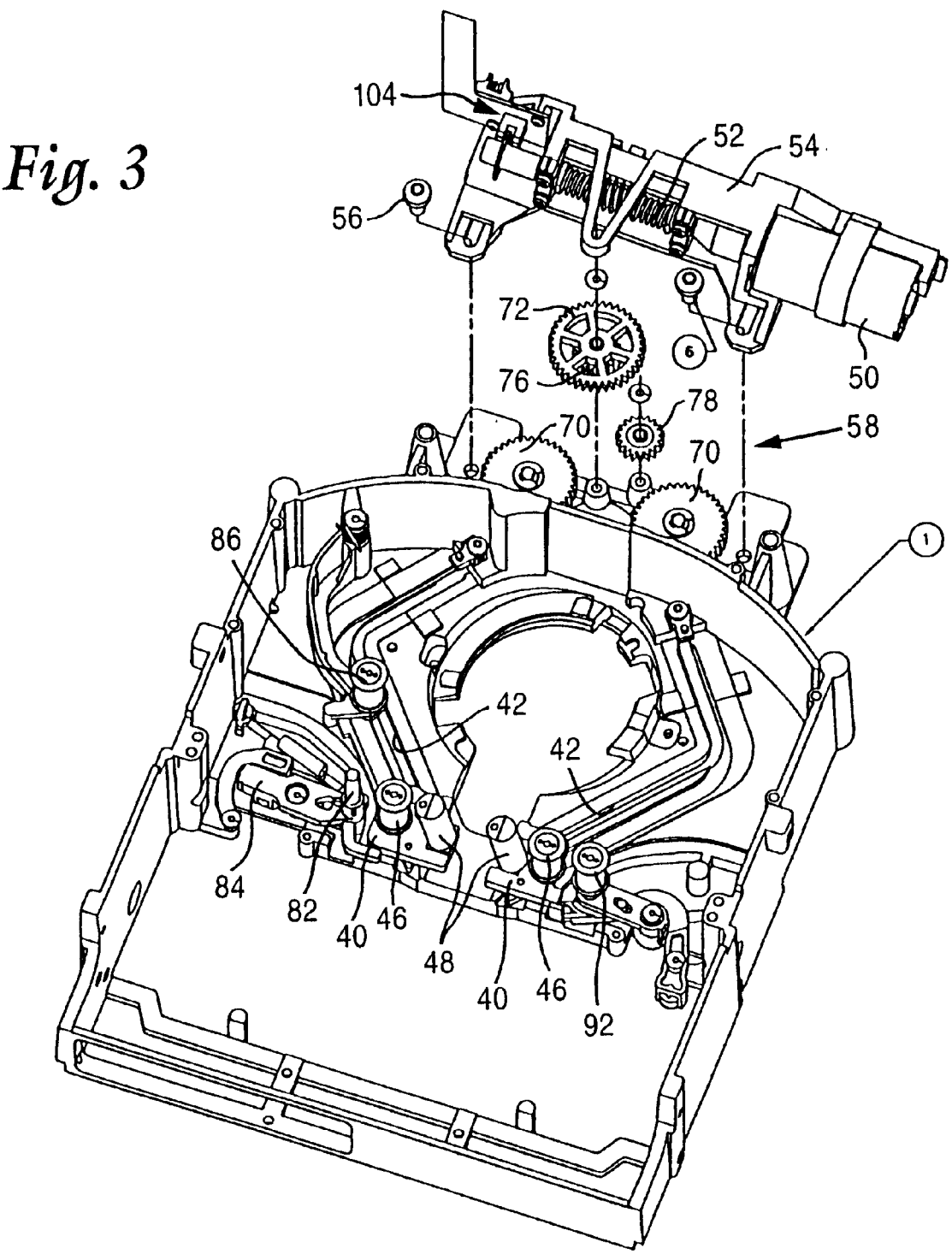
FIG. 3 is a top perspective view, partially exploded, of a tape drive of an embodiment of the present invention, with various elements removed for clarity.

Trolleys 40 travel along trolley paths 42 by being secured to a trolley transmission system. A tape load motor 50, also known as the trolley motor, acts through the trolley transmission system to move trolleys 40 along paths 42. As shown in FIG. 3, for example, tape load motor 50 has a helically threaded output shaft or gear 52. Tape load motor 50 is carried by motor bracket assembly 54. Motor bracket assembly 54 is secured to chassis 22 by fasteners 56.

Figure 4:
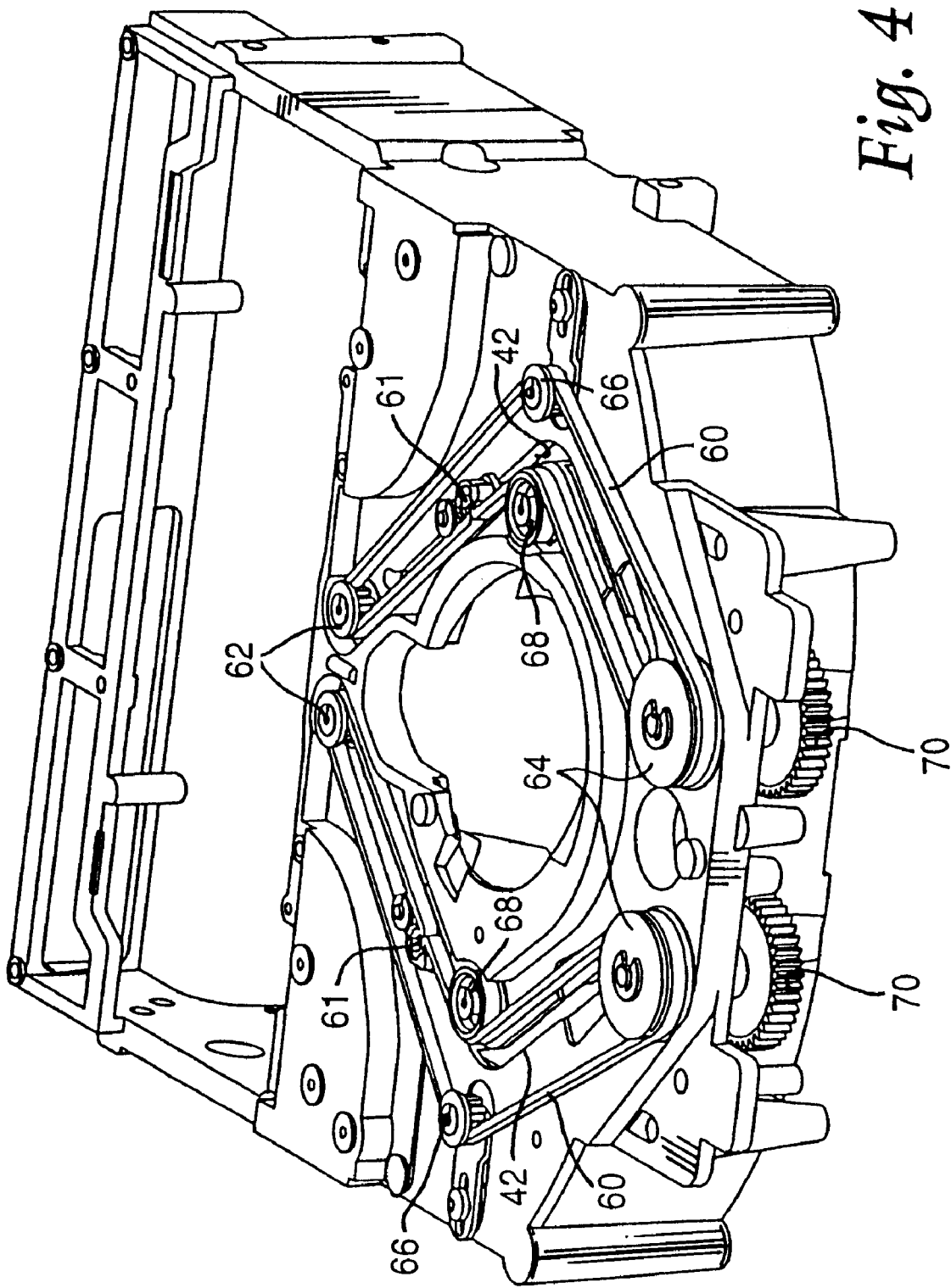
FIG. 4 is a bottom perspective view of a tape drive of an embodiment of the present invention, with various elements removed for clarity.

The trolley transmission system includes a set of gears 58 and trolley transmission belt 60. Each trolley 40 is secured to trolley transmission belt 60 by a clip device 61. FIG. 4 shows an exposed underside of tape drive 20, in which trolley transmission belts 60 are visible. Trolley transmission belts 60 are each entrained about trolley front pulley 62, trolley rear pulley 64, and trolley intermediate pulleys 66 and 68. Trolley rear pulleys 64 are mounted at first ends of shafts which have trolley overtravel gears 70 on their opposite ends. Gears 70, along with gears 72, 76, and 78, form gear set 58 (see FIG. 3).

Gear 72, carried by bracket 54, rotates about an unillustrated shaft and meshes with helically threaded gear 52. Under gear 72 and also mounted to the shaft for uniform rotation with gear 72 is gear 76, which has a smaller diameter than gear 72. One of the gears 70, shown as a left one of the two gears 70 in FIG. 3, meshes with gear 76. The other of the gears 70, shown as a right one of the two gears 70 in FIG. 3, meshes with an auxiliary gear 78. Auxiliary gear 78 in turn meshes with gear 76. Thus, by virtue of meshing at least ultimately with gear 76, and since gear 76 rotates in accordance with the meshing of gear 72 with motor-driven helical gear 52, gears 70 rotate together as the helically geared output shaft 52 of motor 50 rotates. Simultaneous rotation of gears 70 causes simultaneous movement of trolley transmission belts 60, and thus of trolleys 40.

Figure 1B:
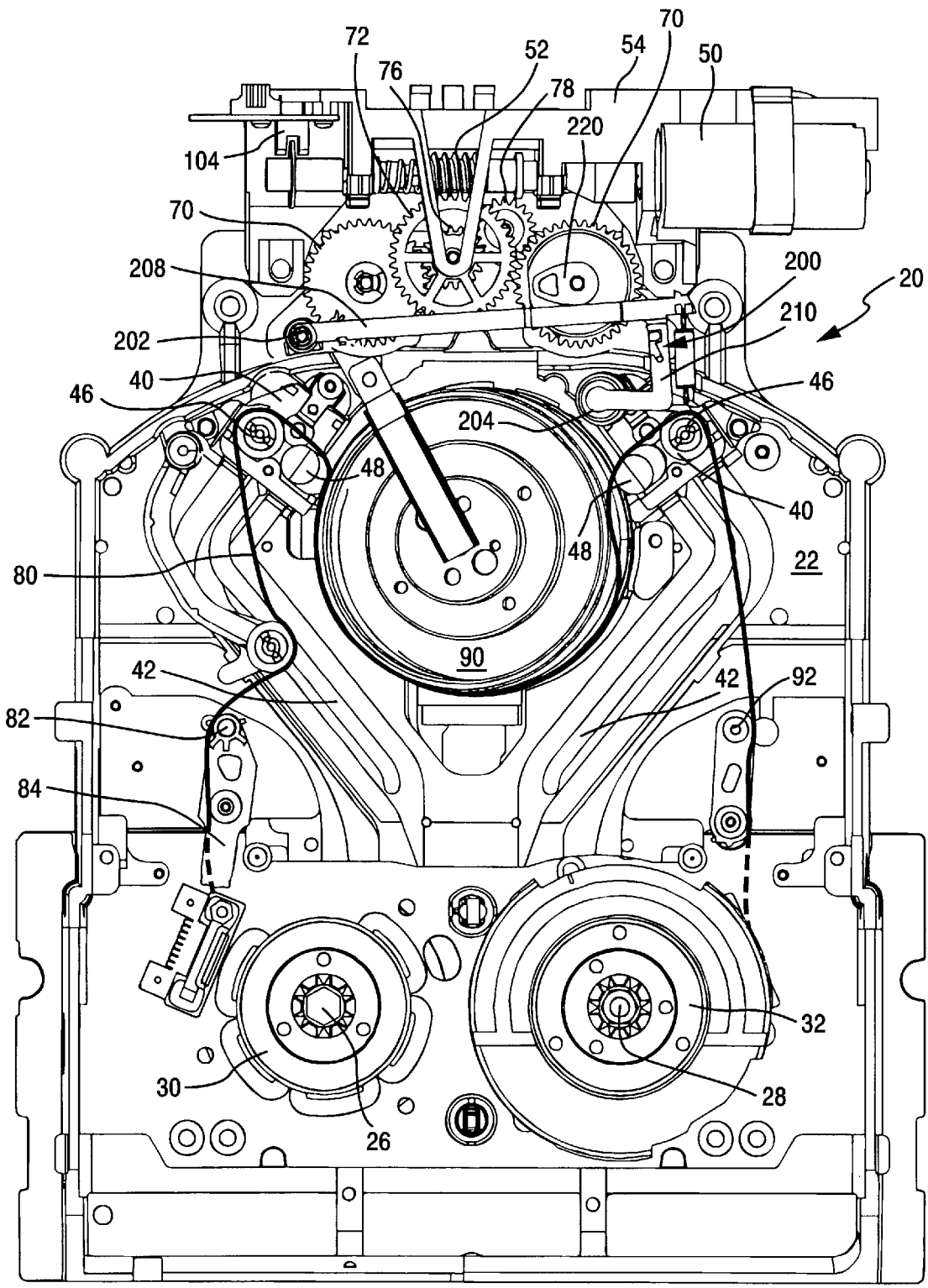
FIG. 1B is a top view of the tape drive of FIG. 1A (also with housing cover removed) but with the tape in a tape full extraction position.

The system for movement of trolleys 40 having been described, it is understood how trolleys 40 move along trolley path 42. From the tape fully retracted position described above and illustrated in FIG. 1A, and upon generation of an tape extraction signal by tape drive 20, trolleys 40 move rearwardly into the drive along trolley path 42. FIG. 1B shows trolleys at the tape fully extracted position.

At the tape fully extracted position shown in FIG. 1B, the tape extends around an operative tape path of tape drive 20.

Line 80, as shown in FIG. 1B, depicts both the tape and the operative tape path. As shown in FIG. 1B, the tape extends around tape guide 82 provided on swing arm 84; around tape guide 86; around tape guides 46 and 48 of a first trolley 40; around a portion of the periphery of drum or scanner 90; around tape guides 48 and 46 of a second trolley 40; and around tape guide 92. In the fully extracted position, unillustrated read and write heads mounted on the periphery of drum 90 travel along helical paths of the tape.

Some skilled in the art refer to tape extraction operation as being a tape load operation and a tape retraction operation as being a tape unload operation. While the present document chooses the "extraction" and "retraction" terminology primarily to avoid confusion with cartridge loading (into the drive) operations and cartridge unloading (from the drive) operations (as distinguished from tape loading and tape unloading), it should be understood that other terminology as such tape load and unload can be used to describe the extraction and retraction operations of the present invention.

Figure 1C:
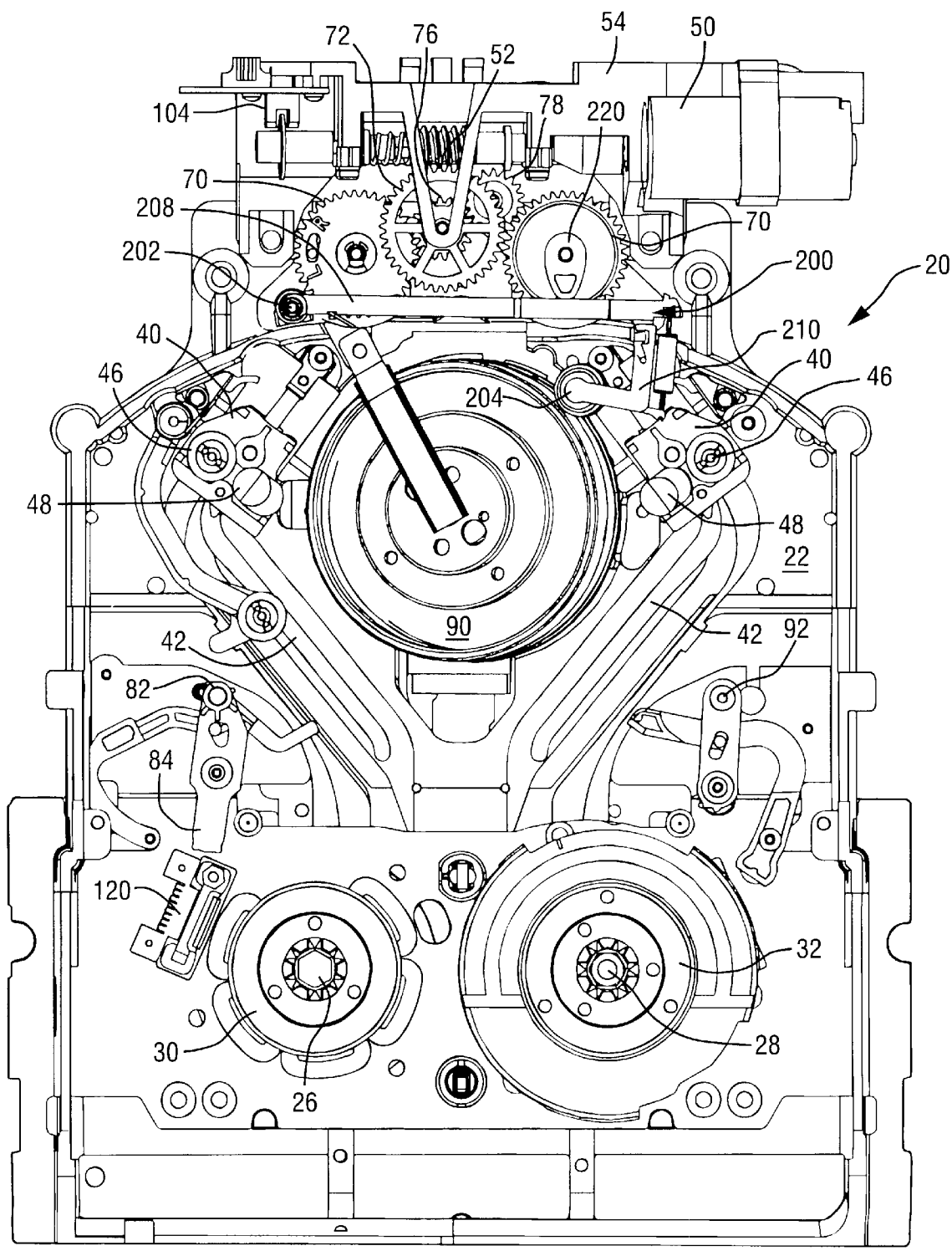
FIG. 1C is a top view of the tape drive of FIG. 1A (also with housing cover removed) but with the scanner cleaning assembly in an engagement position with a scanner.

As shown in FIG. 1A–FIG. 1C, tape drive 20 also has a scanner cleaning assembly 200. The scanner cleaning assembly 200 is anchored to chassis 22 at pivot point 202. Scanner cleaning assembly 200 includes a cleaning wheel 204 which selectively engages a periphery of scanner 90 for the purpose of removing debris from the write head(s) and read head(s) on scanner 90. Scanner cleaning assembly 200 is biased to a non-engagement position (e.g., in the counterclockwise direction about pivot point 202) by torsion spring 206. Torsion spring 206 is attached to a vertical shaft that is coaxial with pivot point 202.

Figure 6A:
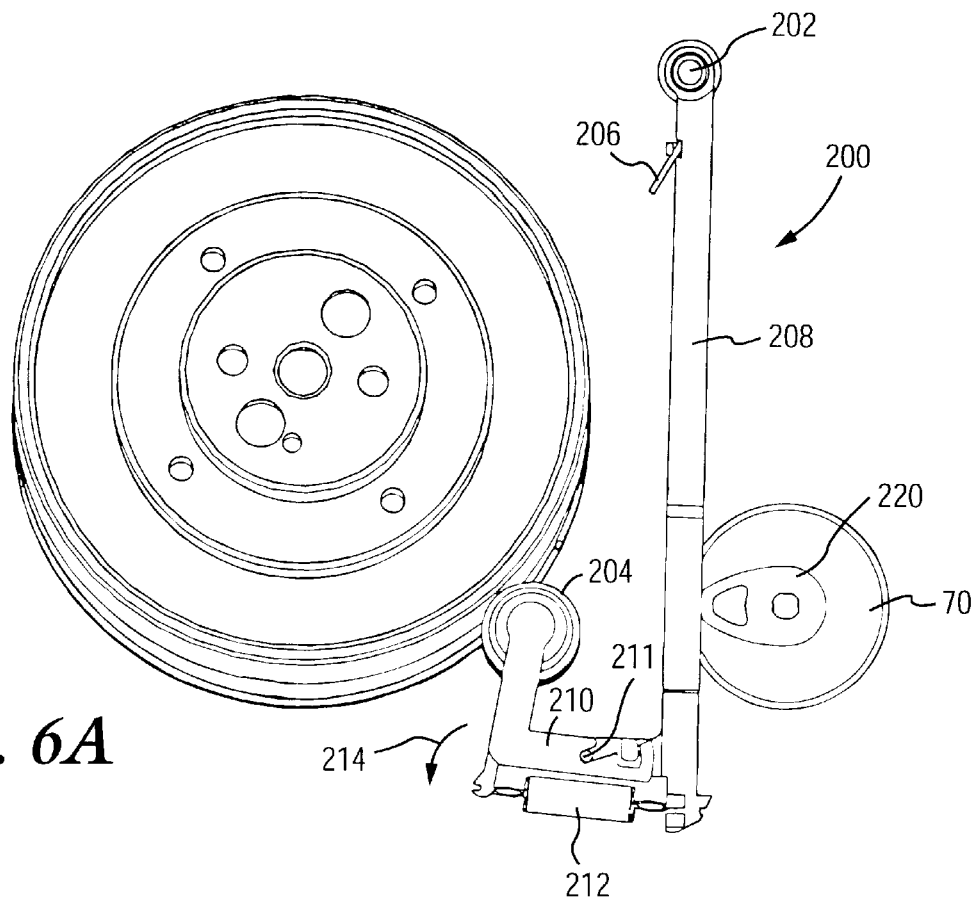
FIG. 6A and FIG. 6B are top and side perspective views respectively of a scanner cleaning assembly of the tape drive of FIG. 1A.
Figure 6B:
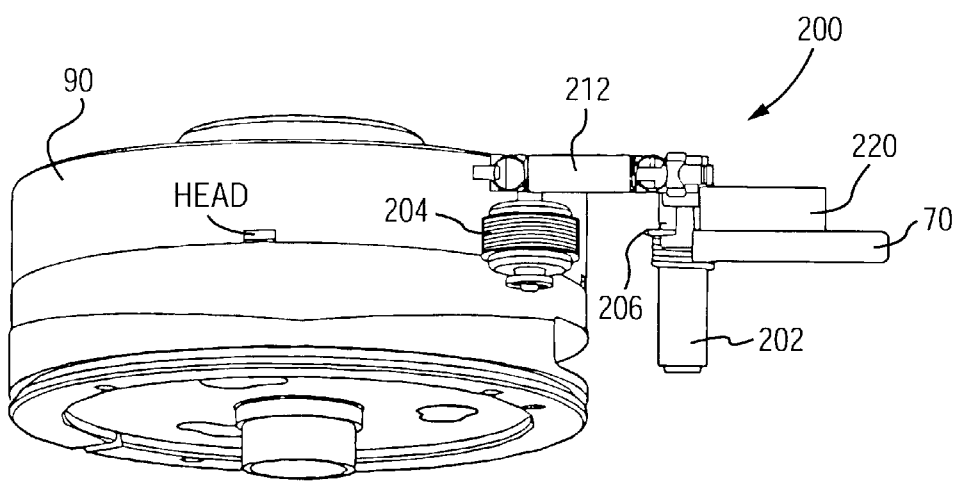

Scanner cleaning assembly 200 is shown in more detail in FIG. 6A and FIG. 6B as comprising not only cleaning wheel 204, but also a cantilevered pivot arm 208 and extension arm 210. One tab of torsion spring 206 is attached to pivot arm 208; another tab of spring 206 is attached to chassis 22. Extension arm 210 is "L" shaped and is pivotally attached at point 211 to a perpendicular member of arm 208. A compression spring 212 biases pivot arm 208 in the direction shown by arrow 214 in FIG. 6A. Cleaning wheel 204 rotatably depends from a distal end of pivot arm 208.

The cleaning wheel 204 is selectively driven into engagement with scanner 90 by action of a cam 220 which is surmounted on the right one of the gears 70 (see FIG. 1A). At the point in time shown in FIG. 1C, cam 220 is rotatably oriented (by action of tape load motor 50 via the set of gears 58) to overcome the biasing afforded by spring 206, thereby driving cleaning wheel 204 into engagement with scanner 90. That is, an eccentric lobe of cam 220 bears against pivot arm 208, thereby pivoting scanner cleaning assembly 200 in a clockwise position about pivot point 202.

Figure 5:
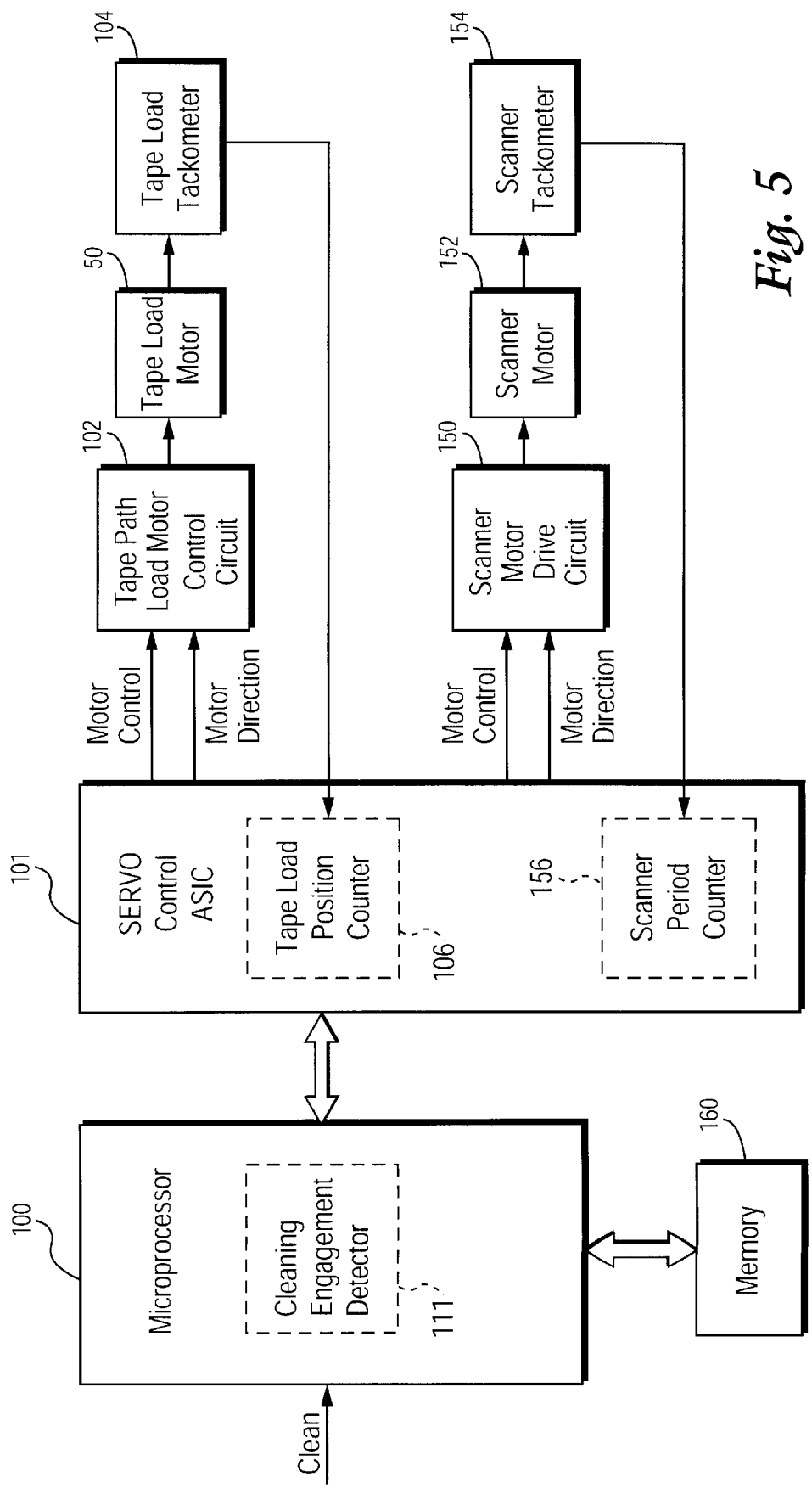
FIG. 5 is a schematic view of a portion of electronics included in the tape drive of FIG. 1A.

FIG. 5 shows motor and electronics components of tape drive 20 pertinent to the present invention. FIG. 5 particularly illustrates a processor 100 (shown as a microprocessor) which executes coded instructions to perform operations hereinafter described. Processor 100 is connected to a servo control circuit 101. Servo control circuit 101 is connected by a motor control PWM output line as well as by a motor direction signal line to tape load motor control circuit 102. Tape load motor control circuit 102 uses the PWM signal outputted by processor 100 to control tape load motor 50.

Tape load motor 50 has an associated tachometer 104, shown in FIG. 1A in the form of a photointerrupter which creates electrical pulses when a peripherally toothed disk, mounted on the output shaft of motor 50, permits transmission of light from a transmitter to a receiver of the photointerrupter. The pulses generated by tape load tachometer 104 are transmitted to a tape load position counter 106 included in servo control circuit 101. Tape load position counter 106 counts the pulses received from tape load tachometer 104 and generates a trolley position signal to microprocessor 100.

The trolley position signal on line 110 applied to processor 100 is particularly utilized by various portions of coded instructions, including a cleaning engagement detector 111 and an unillustrated transfer function. The unillustrated transfer function, is described in more detail in U.S. patent application Ser. No. 08/824,118 filed Mar. 26, 1997 and entitled "PREVENTING TAPE SLACK IN MAGNETIC TAPE DRIVE" (which is incorporated herein by reference) and relates to controlling the trolleys 40 and the supply reel motor in order to prevent tape slack.

Microprocessor 100 is also connected via servo control circuit 101 to scanner motor drive circuit 150. Scanner motor drive circuit 150, like tape load motor control circuit 102, receives both a motor control PWM signal on a motor direction signal from servo control circuit 101. Scanner motor drive circuit 150 controls scanner motor 152. Scanner motor 152 causes rotation of scanner 90. Scanner 90 has a tachometer 154 in the form of a Hall Sensor which issues one tach pulse per revolution of scanner 90. Scanner tachometer 154 is connected to scanner period counter 156 provided in servo control circuit 101.

Microprocessor 100 has access to memory 160. Memory 160 stores various parameters and variables utilized by microprocessor 100.

The tape drive 20 of the present invention advantageously detects engagement of scanner cleaning assembly 200 with scanner 90. Microprocessor 100 serves as a cleaning engagement detector 111 which uses rotational velocity of scanner 90 to detect engagement of cleaning wheel 204 with scanner 90. In particular, cleaning engagement detector 111 detects engagement when a rotational period of scanner 90 increases by a predetermined amount. When cleaning engagement detector 111 detects engagement of cleaning wheel 204 with scanner 90, microprocessor 100 controls a duration of the engagement for avoiding wear of cleaning wheel 204 and the heads on scanner 90.

Figure 7:
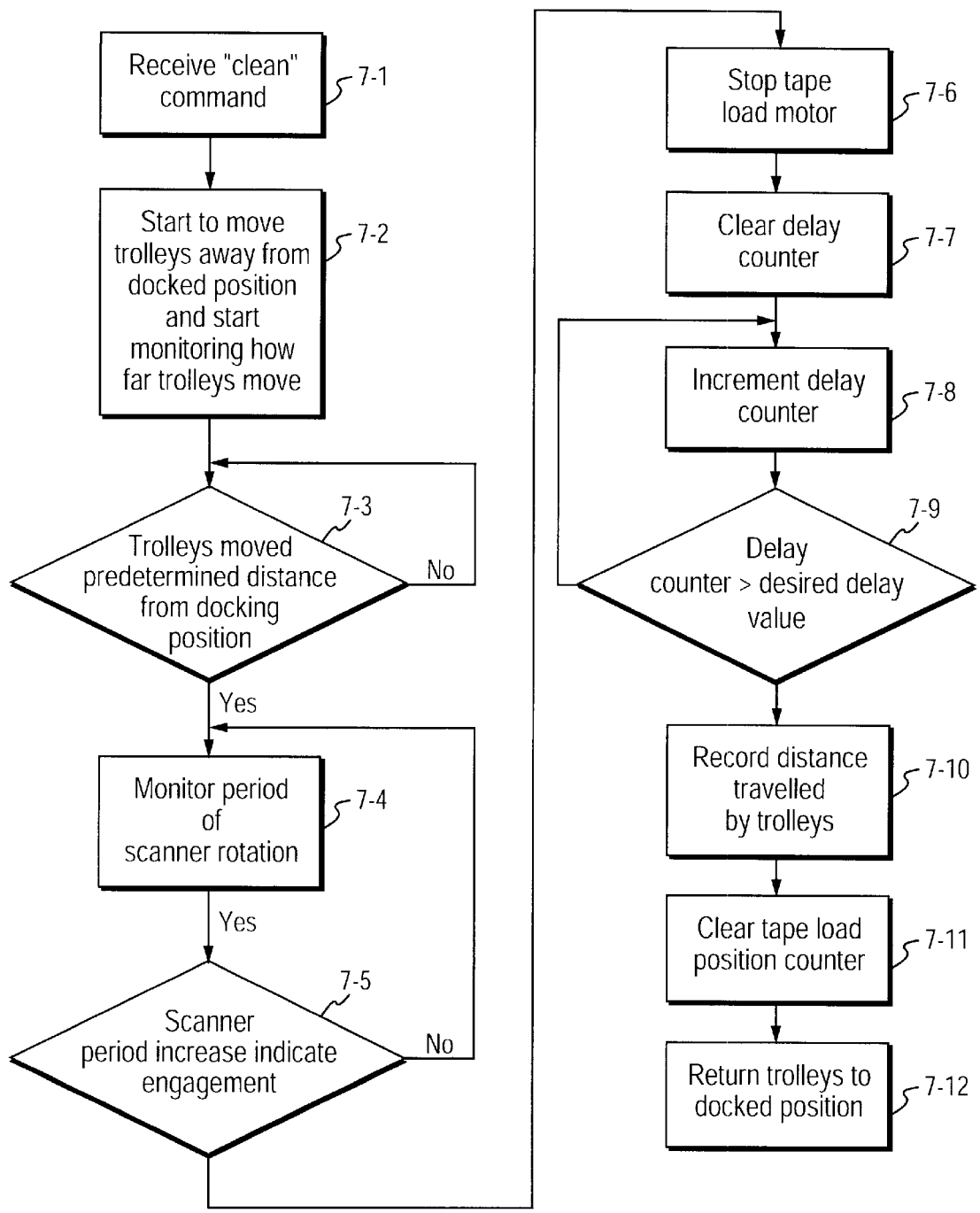
FIG. 7 is a flowchart showing steps performed by the tape drive of FIG. 1A for cleaning a scanner thereof.

FIG. 7 depicts basic steps performed by tape drive 20 for operating scanner cleaning assembly 200. Step 7-1 shows reception of a command to activate scanner cleaning assembly 200. For sake of illustration, such command is illustrated as "CLEAN" in FIG. 5. It should be understood that the "CLEAN" command can occur for various reasons, such as (for example) user input (e.g., via keyboard) or from drive logic (e.g., executed by microprocessor 100). At the time of reception of the "CLEAN" command, the tape is in the fully extracted position as shown in FIG. 1A, e.g., the tape is wrapped around scanner 90.

Upon receipt of the "CLEAN" command at step 7-1, at step 7-2 trolleys 40 begin to move away from their docked position. While the trolleys are in their docked position, the tape is wrapped around scanner 90. The trolleys 40 need to be moved away from their docked position in order to make clearance for cleaning wheel 204. Movement of trolleys 40 at this juncture also orients cam 220 so that cleaning wheel 204 moves toward scanner 90. At step 7-2 microprocessor 100 via servo control circuit 101 issues commands to tape load motor control circuit 102 (see FIG. 5) to start moving the trolleys 40 away from the docked position at a constant velocity. Also at step 7-2, tape load position counter 106 begins to monitor how far the trolleys 40 move. In this regard, as the tape load motor 50 rotates, tape load tachometer 104 generates tach counts which are applied to tape load position counter 106.

Prior to activating cleaning engagement detector 111, the present invention requires (step 7-3) that trolleys 40 move at least far enough for tape load position counter 106 to pick up a predetermined number of tach counts from tape load motor tachometer 104. In other words, microprocessor 100 waits for a predetermined extent of trolley movement away from the trolley docking position prior to activating cleaning engagement detector 111 for monitoring for the engagement. In the illustrated embodiment the predetermined number of tach counts from tape load motor tachometer 104 is fifty.

After the trolleys have moved from the trolley docked position by an amount corresponding to the predetermined number of tach counts, at step 7-4 cleaning engagement detector 111 is activated for monitoring the period of rotation of scanner 90. In this regard, scanner tachometer 154 generates scanner tach counts as scanner 90 rotates. These scanner tach counts are counted by scanner period counter 156 (see FIG. 5). At step 7-4 cleaning engagement detector 111 reads the contents of scanner period counter 156. Cleaning engagement detector 111 knows, for example, that each tach count corresponds to 800 nanoseconds (the nominal scanner period in the illustrated embodiment is about 10.6 milliseconds). At step 74 cleaning engagement detector 111 also calculates two parameters, e.g., delta_period and delta_period_integral. The parameter delta_period is the difference between a current period of rotation of scanner 90 and a previous period of scanner 90. The parameter delta_period integral is the sum of the previous value of delta_period integral and the delta_period parameter.

It should be noted that, after the trolleys have moved from the trolley docked position by an amount corresponding to the predetermined number of tach counts (step 7-3), microprocessor 100 continues to monitor the extent of trolley movement away from the trolley docking position.

At step 7-5 the cleaning engagement detector 111 determines whether the period of rotation of scanner 90 has increased sufficiently to indicate engagement of cleaning wheel 204 with scanner 90. In particular, at step 7-5 the cleaning engagement detector 111 checks whether the value of delta_period integral exceeds a predetermined number. In the illustrated embodiment, the predetermined value of delta_period_integral which indicates engagement is twenty, which corresponds to a 0.15 percent increase in the rotational period for scanner 90.

Thus, movement of trolleys 40 away from their docked position and monitoring of the period of scanner 90 continues until cleaning engagement detector 111 detects engagement at step 7-5. Engagement, along with the positions of trolleys 40 during engagement, in shown in FIG. 1C. Upon detection of engagement of cleaning wheel 204 with scanner 90, at step 7-6 cleaning engagement detector 111 notifies microprocessor 100 to stop trolley load motor 50. Also, at step 7-7 cleaning engagement detector 111 clears a counter known as the delay counter.

Immediately after being cleared, at step 7-8 the delay counter maintained by cleaning engagement detector 111 is incremented by clock pulses (e.g., at the rate of one count per millisecond in the illustrated embodiment). With each incrementation, a check is made (at step 7-9) whether the count value of the delay counter reaches the desired delay value. In the illustrated embodiment, the desired delay value is 50 (e.g., 50 milliseconds). Incrementation continues until the desired cleaning duration is reached.

After the desired delay value is reached, at step 7-10 microprocessor 100 records the distance travelled by trolleys 40 in reaching the position at which engagement of cleaning wheel 204 with scanner 90 was detected (e.g., step 7-5). The distance travelled by trolleys 40 is obtained from tape load position counter 106 in the manner aforedescribed. It should be understood that the tach count gleaned from tape load position counter 106 at step 7-10 is the sum of the predetermined distance required by step 7-3 and the additional distance thereafter travelled until engagement is detected.

The desired cleaning duration, i.e., the desired engagement of cleaning wheel 204 with scanner 90, is related to the desired delay value (e.g., 50 milliseconds in the illustrated embodiment). Given the tolerances of the illustrated system, the desired delay value of 50 milliseconds results in a desired cleaning duration of 200 milliseconds.

With the contents of tape load position counter 106 having been recorded at step 7-10, at step 7-11 the tape load position counter 106 is cleared. Then, at step 7-12, the trolleys 40 are returned to their original docked position. In this regard, at step 7-12 the tape load motor 50 is activated (in the reverse direction) sufficiently so that its output shaft rotates to generate a number of tach counts equal to the tach count gleaned from tape load position counter 106 at step 7-10.

Thus, by monitoring the period of rotation of scanner 90 as cleaning wheel 204 is moved toward scanner 90, cleaning engagement detector 111 can detect when cleaning wheel 204 presses against scanner 90 by noting a marked increase in the rotational period of scanner 90 at the instant of contact. The microprocessor 100 then stops the motion of trolleys 40 for the precise amount of time desired for cleaning the heads scanner 90. Thereafter, the trolleys 40 are moved back toward the original docked position in order to disengage cleaning wheel 204 from scanner 90. The present invention thus allows contact of cleaning wheel 204 with scanner 90 to be controlled to within approximately one tenth of a second in the face of significant drive to drive variation in the trolley unload distance required to engage cleaning wheel 204.

In the illustrated embodiment, the desired duration of engagement of cleaning wheel 204 with scanner 90 is preferably 0.2 seconds. The desired duration of engagement may vary in accordance with various factors pertaining to the drive and the cleaning system thereof. The person skilled in the art can empirically determine a desired duration of engagement, realizing that too short a duration may not have a desired cleaning effect and that too long a duration may cause enough friction between heads and cleaning wheel 204 to heat cleaning wheel 204 to an extent that a deposit may be left on the heads of scanner 90.

Microprocessor 100 monitors the rotational speed of scanner 90 by reading the contents of scanner period counter 156. Based on the scanner period count, microprocessor 100 adjusts the motor control signal to scanner motor drive circuit 150 in an effort to maintain the desired scanner rotational speed. Maintaining the desired scanner rotational speed is important since, in the absence of mechanical interference with the rotation of scanner 90, the closed loop control system achieves very accurate control of the rotational speed of scanner 90. Specifically, in the absence of the aforementioned interference, in the illustrated embodiment the speed of scanner 90 does not increase by more than 0.1 percent (actual speed control is +/−0.03 percent). This accurate speed control allows the use of a large transient in speed of scanner 90 to be used as a reliable indicator of mechanical interference with rotation of scanner 90, namely as an indication of contact of cleaning wheel 204 with scanner 90.

Microprocessor 100 controls the position of trolleys 40 by (1) generating a profile of the desired trolley position verses time; and (2) modulating the motor control signal to tape path load motor 102 in order to assure that the measured trolley motion (as inferred from the value read from tape load position counter 106) is in accordance with the desired trolley motion.

The supply reel is also active during motion of trolleys 40. The supply reel acts to prevent slack tape from being left in the tape path by (1) moving to a desired position (measured by supply reel tachometer 120) calculated from the trolley motion, or (2) applying a constant force to the tape to keep the tape taut in the tape path as the trolleys unload.

The closed loop system described above enables an accurate return of trolleys 40 to their docked position after engagement and cleaning of scanner 90 using scanner cleaning assembly 200.

It should be understood that the functions of detector 111 could, instead of being performed by a microprocessor, be performed by a hardware circuit or by other means. Moreover, the invention is applicable for scanner cleaning assemblies of various types, not just those which employ cleaning wheels. That is, the closed loop technique of the present invention is not limited to the cleaning wheel articulation method illustrated, but is applicable to any type of cleaning device actuation. For example, the method and principles of the present invention apply to provide precise control of contact time and contact verification in a solenoid-actuated cleaning system.

While the invention has been described in connection with what is presently considered to be the most practical and preferred embodiments and modes, it is to be understood that the invention is not to be so limited, but on the contrary, is intended to cover various modifications and equivalent arrangements included within the spirit and scope of the appended claims.

What is claimed is:

1. A magnetic tape drive comprising:
    a scanner upon which is mounted at least one of a read element and a write element for transducing information with respect to the magnetic tape;
    a cleaning mechanism which selectively engages the scanner;
    a detector which uses rotational velocity of the scanner to detect engagement of the cleaning mechanism and the scanner.

2. The apparatus of claim 1, wherein the detector detects engagement when a rotational period of the scanner increases by a predetermined amount.

3. The apparatus of claim 1, comprising a controller which, when the detector detects engagement of the cleaning mechanism with the scanner, controls a duration of the engagement.

4. The apparatus of claim 1, further comprising:
    a trolley for selectively moving the tape into and out of contact with the scanner;
    a transmission system which provides coordinated movement of the trolley and the cleaning mechanism;
    a controller which monitors an extent of trolley movement.

5. The apparatus of claim 4, wherein the controller waits for a predetermined extent of trolley movement away from a trolley docking position prior to activating the detector.

6. The apparatus of claim 5, wherein, after the predetermined extent of trolley movement, the controller determines an additional extent of trolley movement away from the trolley docking position which occurs prior to the engagement.

7. The apparatus of claim 6, wherein the controller, upon detection of engagement, controls duration of the engagement.

8. The apparatus of claim 7, wherein the controller, after expiration of the duration of the engagement, uses the predetermined extent of movement and the additional extent of trolley movement in order to control a return movement of the trolley to the trolley docking position.

9. The apparatus of claim 1, wherein the cleaning mechanism comprises a rotatable roller.

10. A magnetic tape drive comprising:
    a scanner upon which is mounted at least one of a read element and a write element for transducing information with respect to the magnetic tape;
    a cleaning mechanism which selectively engages the scanner;
    a detector which uses rotational velocity of the scanner to detect engagement of the cleaning mechanism and the scanner;
    a trolley for selectively moving the tape into and out of contact with the scanner;
    a transmission system which provides coordinated movement of the trolley and the cleaning mechanism;
    a controller which (1) monitors trolley movement; (2) enables the detector in accordance with trolley movement; and (3) when the detector detects engagement of the cleaning mechanism with the scanner, controls a duration of the engagement.

11. The apparatus of claim 10, wherein the controller waits for a predetermined extent of trolley movement away from a trolley docking position prior to activating the detector.

12. The apparatus of claim 11, wherein, after the predetermined extent of trolley movement, the controller determines an additional extent of trolley movement away from the trolley docking position which occurs prior to the engagement.

13. The apparatus of claim 12, wherein the controller, after expiration of the duration of the engagement, uses the predetermined extent of movement and the additional extent of trolley movement in order to control a return movement of the trolley to the trolley docking position.

14. The apparatus of claim 10, wherein the detector detects engagement when a rotational period of the scanner increases by a predetermined amount.

15. A method of operating a magnetic tape drive, the method comprising:
    selectively engaging a scanner with a cleaning mechanism, the scanner having mounted thereon at least one of a read element and a write element for transducing information with respect to the magnetic tape;
    using rotational velocity of the scanner to detect engagement of the cleaning mechanism and the scanner.

16. The method of claim 15, further comprising detecting engagement when a rotational period of the scanner increases by a predetermined amount.

17. The method of claim 15, further comprising, after detecting engagement of the cleaning mechanism with the scanner, controlling a duration of the engagement.

18. The method of claim 15, further comprising:
    using a trolley for selectively moving the tape into and out of contact with the scanner;

coordinating movement of the trolley and the cleaning mechanism;

determining an extent of trolley movement.

19. The method of claim 18, further comprising commencing monitoring for the engagement after a predetermined extent of trolley movement away from a trolley docking position.

20. The method of claim 19, further comprising, after the predetermined extent of trolley movement, determining an additional extent of trolley movement away from the trolley docking position which occurs prior to the engagement.

21. The method of claim 20, further comprising, upon detection of engagement, controlling the duration of the engagement.

22. The method of claim 21, further comprising, after expiration of the duration of the engagement, using the predetermined extent of movement and the additional extent of trolley movement for controlling a return movement of the trolley to the trolley docking position.

23. A method of operating a magnetic tape drive comprising:

using a trolley for selectively moving magnetic tape into and out of contact with a scanner, the scanner having mounted thereon at least one of a read element and a write element for transducing information with respect to the magnetic tape;

coordinating movement of the trolley and a movement of a cleaning mechanism relative to the scanner;

using rotational velocity of the scanner to detect engagement of the cleaning mechanism with the scanner;

upon a detection of engagement, controlling a duration of the engagement.

24. The method of claim 23, wherein the step of using rotational velocity of the scanner to detect engagement of the cleaning mechanism with the scanner occurs after a predetermined extent of trolley movement away from a trolley docking position.

25. The method of claim 24, further comprising, after the predetermined extent of trolley movement, determining an additional extent of trolley movement away from the trolley docking position which occurs prior to the engagement.

26. The method of claim 25, further comprising, after expiration of the duration of the engagement, using the predetermined extent of movement and the additional extent of trolley movement for controlling a return movement of the trolley to the trolley docking position.

27. The method of claim 23, further comprising detecting engagement when a rotational period of the scanner increases by a predetermined amount.

28. A magnetic tape drive comprising:

a scanner upon which is mounted at least one of a read element and a write element for transducing information with respect to the magnetic tape;

a cleaning mechanism which selectively engages the scanner;

a detector which detects engagement of the cleaning mechanism and the scanner;

a trolley for selectively moving the tape into and out of contact with the scanner;

a transmission system which provides coordinated movement of the trolley and the cleaning mechanism;

a controller which monitors an extent of trolley movement, wherein the controller waits for a predetermined extent of trolley movement away from a trolley docking position prior to activating the detector, and wherein, after the predetermined extent of trolley movement, the controller determines an additional extent of trolley movement away from the trolley docking position which occurs prior to the engagement.

29. The apparatus of claim 28, wherein the controller, upon detection of engagement, controls duration of the engagement.

30. The apparatus of claim 29, wherein the controller, after expiration of the duration of the engagement, uses the predetermined extent of movement and the additional extent of trolley movement in order to control a return movement of the trolley to the trolley docking position.

31. A method of operating a magnetic tape drive, the method comprising:

using a trolley for selectively moving the tape into and out of contact with a scanner, the scanner having mounted thereon at least one of a read element and a write element for transducing information with respect to the magnetic tape;

determining an extent of trolley movement;

selectively engaging the scanner with a cleaning mechanism;

coordinating movement of the trolley and the cleaning mechanism;

detecting engagement of the cleaning mechanism and the scanner;

commencing monitoring for the engagement after a predetermined extent of trolley movement away from a trolley docking position; and, after the predetermined extent of trolley movement, determining an additional extent of trolley movement away from the trolley docking position which occurs prior to the engagement.

32. The method of claim 31, further comprising, upon detection of engagement, controlling the duration of the engagement.

33. The method of claim 32, further comprising, after expiration of the duration of the engagement, using the predetermined extent of movement and the additional extent of trolley movement for controlling a return movement of the trolley to the trolley docking position.

* * * * *